United States Patent [19]

Myers

[11] 3,862,425
[45] Jan. 21, 1975

[54] RADIATION POSITION DETECTORS

[75] Inventor: Melvyn John Myers, Balmedie, Scotland

[73] Assignee: National Research Development Corporation, London, England

[22] Filed: Mar. 5, 1973

[21] Appl. No.: 338,262

[30] Foreign Application Priority Data
Mar. 8, 1972  Great Britain..................... 10798/72

[52] U.S. Cl. ................................. 250/366, 250/369
[51] Int. Cl. ............................................... G01t 1/20
[58] Field of Search........................... 250/369, 366

[56] References Cited
UNITED STATES PATENTS
| | | | |
|---|---|---|---|
| 3,502,873 | 3/1970 | Woronowicz | 250/366 |
| 3,573,458 | 4/1971 | Anger | 250/369 |
| 3,612,865 | 10/1971 | Walker | 250/369 |
| 3,684,886 | 8/1972 | Muehllegner | 250/369 |

Primary Examiner—James W. Lawrence
Assistant Examiner—Harold A. Dixon
Attorney, Agent, or Firm—Cushman, Darby & Cushman

[57] ABSTRACT

A radiation position detector is described particularly for detecting the source of gamma radiation over which a gamma camera is scanned. Electrical signals are generated representing the co-ordinates of the focal point of the gamma camera and of the received radiation. The received radiation signals are multiplied by a compensating factor to correct for a particular depth of radiation so that radiation starting at that depth is in focus. The corrected signals and the camera co-ordinate signals are combined so that a picture can be obtained in focus for the particular depth. Multiplexing may be used to provide correction for a plurality of depths.

11 Claims, 6 Drawing Figures

Fig 2.

RADIATION POSITION DETECTORS

The present invention relates to devices for detecting the positions of sources of radiation. In particular it is concerned with devices in which radiation from a source is collimated and the co-ordinates of the received radiation described by electrical signals. The radiation may be, for example, infra-red, X-ray or ultrasonic.

However the present invention is especially, though not exclusively, concerned with gamma cameras having a focusing collimator for collimating gamma radiation, a scintillation detecting crystal for receiving the collimated radiation, and an array of suitable photodetectors for determining the co-ordinates of scintillations in the scintillation crystal caused by the gamma radiation.

Such gamma cameras are frequently used for the examination of tumours in patients. For this purpose the patient is injected with a substance containing a radioactive isotope which tends to accumulate in the tumour. By then scanning the gamma camera over the tumour and obtaining a picture of the variations in intensity of the gamma radiation from the tumour and its surrounds a picture of the extent of the tumour can be obtained. However this picture is severely limited as to information concerning the depth of the tumour.

In accordance with the present invention, there is provided for a radiation position detecting device having a collimator for collimating radiation, means for deriving electrical signals representing the co-ordinates of the received collimated radiation, means for deriving a signal representing the co-ordinates of the focal point of the collimator, means for compensating the received radiation signals itself by multiplication of the latter by a constant representing the ratio between the distance between a selected plane parallel to the focal plane of the collimator and the focal plane itself, and the distance between the focal plane and the plane in which the collimated radiation is detected, and means for combining the co-ordinate signals of the focal point of the collimator with the received radiation signals so that the resultant signals are corrected to give the true co-ordinates of any events occuring in the selected plane.

In accordance with a feature of the present invention, there may further be provided for separating the received radiation signals into a number of equal signals, and means for multiplying each of these signals with a different compensating value, the compensating values representing a range of depths, so that each of the received radiation signals is corrected to give the true co-ordinates of events occurring in a selected plane.

Thus means may be provided for sampling the received radiation signals, for dividing the sampled signals into equal pulses, multiplying each pulse with a selected compensating value, and for multiplexing the resultant signals so that they can be individually stored or displayed.

An embodiment of the present invention will now be described by way of example and with reference to the accompanying drawings, in which.

DETAILED DESCRIPTION OF THE PREFERRED EMBODIMENT

Figure 1:
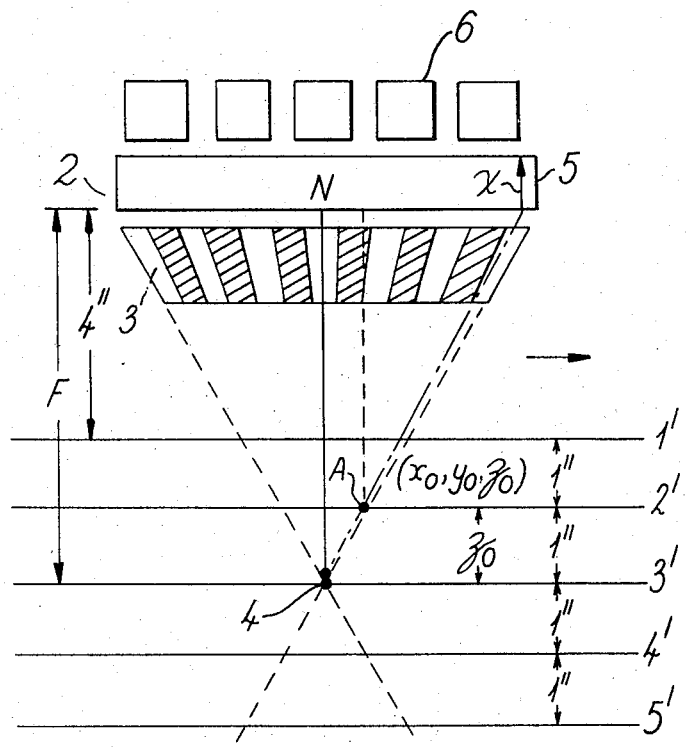
FIG. 1 is a diagrammatic axial section through the collimator and scintillation crystal of a gamma camera.

In the description of the preferred embodiment given hereinbelow, the coordinates $x$ and $y$ represent the movement of the focus of the gamma camera with respect to a couch upon which the patient is positioned, while the coordinates $X$ and $Y$ represent the coordinates of the scintillation received by the gamma camera of the present invention.

The gamma camera 1 shown in the accompanying drawings comprises a collimator 2 having a plurality of channels 3 the axes of which are convergent on a focus 4. Gamma radiation, for example from an event 4, passes through a channel in the collimator 1 and causes a scintillation $\alpha$ in a scintillation crystal 5 of a conventional type. The co-ordinates of the scintillation $\alpha$ are obtained from a matrix of photocubes 6 the outputs of which are weighted by given factors in both the X- and the Y- co-ordinates. Thus by summing the outputs of the phototubes 6 along the X- and Y- scintillation crystal co-ordinates, signals can be obtained representing the scintillation co-ordinates. These signals are the received radiation signals. To compensate for the variation in intensity of scintillations the summed and weighted outputs of the phototubes 6 are normalised by division by the total output which is weighted to compensate for variations in sensitivity.

When the gamma camera 1 is in use, a patient is supported on a couch 7, and the couch 7 is moved relative to the camera 1 by a pair of electric motors which are not shown. The $x$- and $y$- co-ordinates of the couch relative to the camera are derived from a pair of potentiometers 27 and 28, respectively. These co-ordinate signals also represent the co-ordinate signals of the focal point of the collimator 1.

During the examination, the couch 7 will be moved in such a manner that the camera is scanned sequentially over the patient. The output of the camera would, in a conventional system, then be displayed in a suitable manner; for example, either on a cathode ray tube or by being printed out. The resultant picture would show variations in the intensity of gamma radiation as the camera was scanned over the tumour.

However, the picture so obtained would be extremely difficult, to evaluate in terms of the depth and dimensional extent of the tumour. Such information is, of course, extremely valuable when diagnosing and planning the treatment of the tumour. In the embodiment described herein the information derived in the form of X- and Y- co-ordinate signals from the scintillation crystal of the gamma camera 1 and the $x$- and $y$- co-ordinate signals from the couch 7 is processed in such a manner that accurate pictures can be obtained for a plurality of planes at varying depths relative to the focal plane of the gamma camera 1.

In order to simplify the explanation as to how the various co-ordinate signals can be processed to achieve this result, let the case of a single event A be considered, this event A occuring at co-ordinates $x_o$, $y_o$, and $z_o$, $z_o$ being its distance from the focal plane of the collimator of a gamma camera of focal strength F. The co-ordinates $x_o$, $y_o$ and $z_o$ are the true co-ordinates of the event A. Let it also be assumed that the scintillation caused by the collimated gamma ray from the event A gives rise to received radiation signals X, Y from the gamma camera.

Finally let it be assumed that the co-ordinates of the focus of the camera are given by the x- and y- co-ordinate signals derived from the motion of the couch 7. This situation is shown in FIG. 1 of the accompanying drawings. In this consideration the convention is used that all X- co-ordinates (gamma camera) to the right of the normal N are positive, and all to the left are negative. A similar convention applied to the values of $z_o$ above and below the focal plane of the gamma camera.

It is obvious from FIG. 1 that the gamma camera co-ordinates X, Y obtained from the collimated radiation do not represent the true co-ordinates of the event A relative to the reference frame provided by the x-, y- co-ordinates of the focus of the gamma camera. Thus the X-, Y- co-ordinates will have to be corrected. Let the corrected values be $x'$, $y'$.

Figure 6:
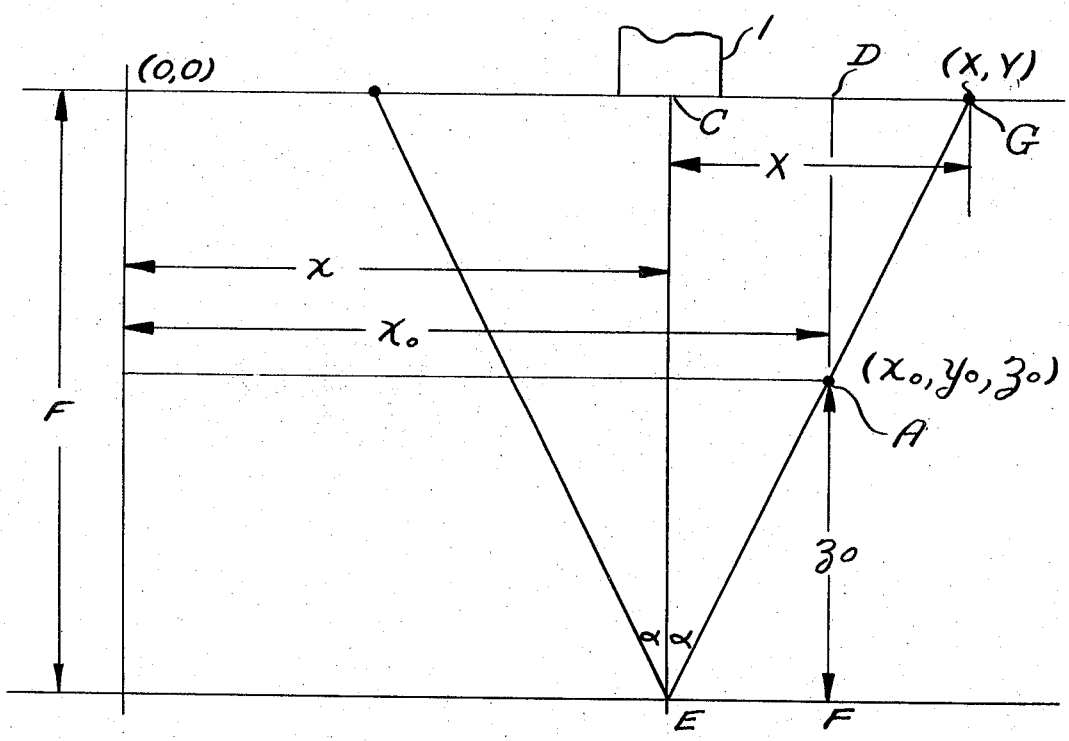
FIG. 6 is a diagram illustrating the derivation of equations 3 and 4.

Accordingly $$x' = x + kX \qquad (1)$$

$$y' = y + kY \qquad (2)$$

x and y are of course already known as they are derived directly from the relative movement between the gamma camera and the couch. Furthermore, referring to FIG. 6, it can easily be seen that $X_o-X$ and X are equivalent sides of a pair of similar triangles having $z_o$ and F as another pair of equivalent sides, it is apparent that $$X/x_o-x = F/z_o \qquad (3)$$

Similar reasoning applies to the Y co-ordinates, and $$Y/y_o-y = F/z_o \qquad (4)$$

Thus substituting the values obtained for X and Y in equations (3) and (4) in equations (1) and (2)

$$x' = kFx_o/z_o + x(1-kF)/(z_o) \qquad (5)$$

$$y' = kFy_o/z_o + y(1-kF)/(z_o) \qquad (6)$$

It is readily apparent that equations (5) and (6) are invariant if $kF = z_o$.

Thus for those occasions when $kF = z_o$, or $k = z_o/F$, $x' = x_o$ and $y' = y_o$, That is, the corrected co-ordinates obtained by multiplying the gamma camera co-ordinates X, Y by k where $k = z_o/F$ will give the true co-ordinates of an event occurring at the depth $z_o$. Naturally, for all events not lying on the plane $z_o$, the correction $k = z_o/F$ will be incorrect and the true co-ordinates will not result. Furthermore, the further away an event is from the level $z_o$ the greater will be the error, and this error will be still further magnified by the fact that a wrong correction will be applied in both the X and the Y- co-ordinates, thus having the effect of progressively "smearing" the co-ordinates of the event.

In the embodiment being described the outputs of the gamma camera 1 and the couch 7 are processed so as to give corrected pictures for five separate planes. The camera 1 has a focal length of 6 inches, from the plane of the scintillation crystal and the five planes are shown in FIG. 1 as lying symmetrically about with the focal plane, with two planes above the focal plane and two below. The separation between successive planes is 1 inch. It is thus apparent that the correction k to be applied to correct the received radiation co-ordinates of events lying in plane 1' is $k = 2/6$. Similarly for plane 2', $k = 1/6$ Thus for the five planes shown in FIG. 1, the following sequence of values for k can be obtained.

$2/6, 1/6, o, -1/6, -2/6$.

Accordingly, in order to obtain a corrected picture of events occurring in each of the planes 1', 2', 3', 4' and 5' the five following corrected signals have to be used.

$x + 2X/6, x + X/6, x, x - X/6, x - 2X/6$ where x is the couch co-ordinate signal and X is the received radiation co-ordinate signal from the gamma camera. The same sequence can easily be derived for the y co-ordinates.

Figure 2:
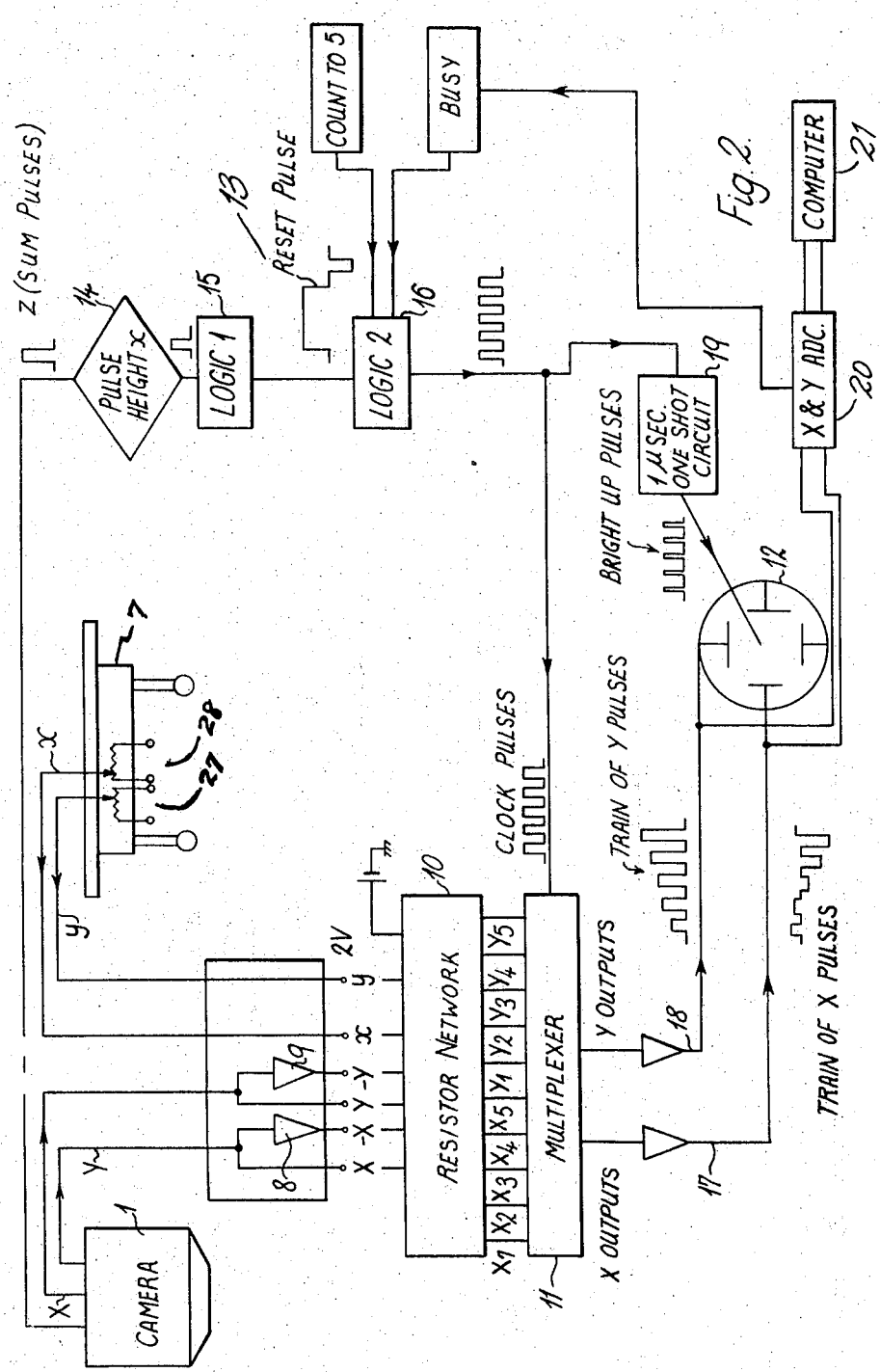
FIG. 2 is a block diagram of circuitry for compensating the output signals of a gamma camera constructed in accordance with the present invention.
Figure 3:
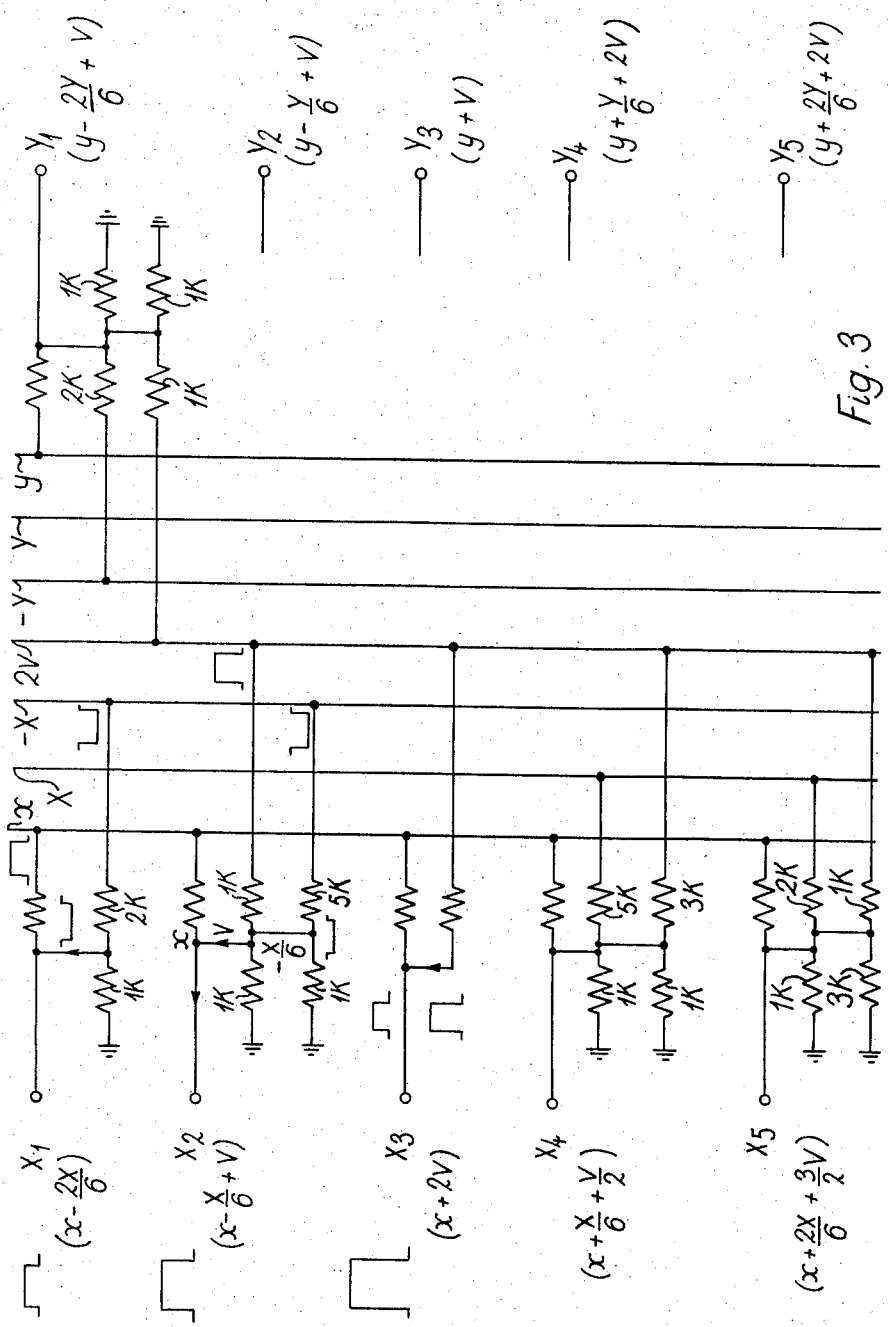
FIG. 3 is a circuit diagram of a resistive network forming part of the block diagram of FIG. 2.
Figure 5:
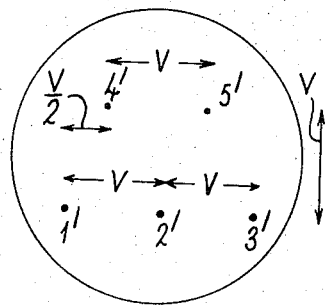
FIG. 5 is a side elevation view of the face of a cathode ray tube.
Figure 4:
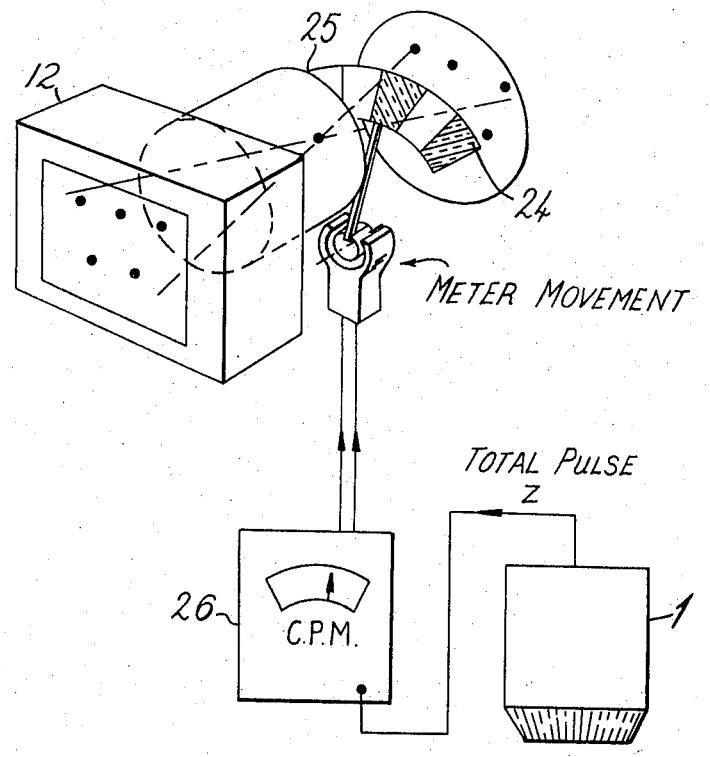
FIG. 4 is a perspective view of means for colour coding the output of the system of FIGS. 2 and 3.

The block diagram of FIG. 2 shows how the necessary compensated output signals are obtained. The X and Y signals from the camera 1 are inverted at 8 and 9 to obtain the -X and -Y values, and the X, -X, Y, -Y, x and y (from the couch 7) signals are all fed into a resistance network shown in greater detail in FIG. 3. A further voltage of 2V is supplied to the resistance network 10 to provide separation of the pictures of each layer when the latter are displayed on a cathode ray tube indicated at 12. As can be seen from FIG. 3 the resistance network has five output arms for the X-co-ordinates each containing appropriately proportioned resistances so that the five outputs obtained are the x-co-ordinates signals from the patients couch and gamma camera X-co-ordinate signals compensated for the selected sequence of layers. There are five similar output arms for the Y-co-ordinates, but these are not shown in detail as they are virtually identical to the X-co-ordinate output arms. The only difference is the treatment of the 2V volts signal added to provide separation of the five pictures in the screen of the cathode ray tube.

The ten separate output signals obtained from the resistance network thus represent five pairs of X- and Y- co-ordinate signals, each pair of signals being compensated so that events occurring at a selected depth from the face of the scintillation screen 5 will be in sharp focus whilst events occurring farther and farther away from the selected depth will be progressively out of focus. In order to display this effectively each set of co-ordinate signals referring to a particular depth has to be separated from the signals representing the other levels and displayed individually. This is done by a multiplexer 11 into which the five pairs of co-ordinate signals are fed. The operation of the miltiplexer 11 and the bright-up of the cathode ray tube 12 on which the compensated co-ordinate signals are displayed is controlled by a series of logic circuits generally indicated at 13.

The logic circuits 13 comprise a pulse height analyser 14 into which the summed output of the camera 1 is supplied and which gives an output pulse to a pulse generator 15 if the summed output pulse is of sufficient magnitude. The pulse generator 15 gives as its output a wide positive going pulse and a narrow reset pulse to a pulse divider 16 which divides the wide pulse into a series of five equal positive going pulses. These are supplied as clock pulses to switch in sequence the five channels of the multiplexer 11. The latter has two output lines 17 and 18, the output line 17 carrying a train of X-co-ordinate pulses and the output line 18 carrying a train of Y-co-ordinate pulses. Each train of pulses is divided into sequences of five pulses, each pulse in each sequence of five representing the X- or Y-co-ordinates of the same scintillation, but having applied to it a different compensating value representing a selected depth. Furthermore the pulses in each sequence of five are also differentiated from one another by the addition of a voltage derived from the 2V input to the resistance network 10 which is added, as mentioned hereinbefore, to separate the signals when they are displayed on the cathode ray tube 12.

The pulse divider 16 also provides the bright-up pulses for the cathode ray tube 12 via a 1 μ second monostable circuit 19.

The end result is that five separate pictures of the area scanned by the camera 1 are shown simultaneously on the cathode ray tube 4. The relative positions of the five pictures are shown in FIG. 3A, where 1' represents the scintillation whose co-ordinates are given by the first pair of corresponding X- and Y-co-ordinate pulses of a sequence of five. Any scintillation caused by events on or close to the layer nearest to the scintillation screen 5 will be sharply in focus in this particular picture. However any scintillations initiated by an event lying on the layer farthest away from the screen 5 will be extremely blurred, with corresponding variations for events occurring between these two extremes. Similarly at 2' scintillations caused by events lying on the layer which is second nearest to the scintillation screen 5 will be in sharp focus and so on with the other pictures at 3', 4' and 5'.

In order that the output of the camera 1 can be stored digitally and subsequently analysed by a computer, the two output lines 17, 18 of the multiplexer may also be connected to an analogue-to-digital converter 20 and the digitally converted information stored in a computer 21.

When the information is being converted into digital form it is necessary to limit the output from the multiplexer 11 to a rate acceptable to the analogue-to-digital converter 20. The latter is accordingly connected via a line 22 to a logic circuit 23 which gives an inhibit signal to the divider 16 should the analogue-to-digital converter be busy.

In order to emphasise the contrast between in- and out- of focus pictures from different planes a colour coding scheme may be used in which the pictures on the screen of the cathode ray are photographed as they appear on the screen. In order to do this a colour filter 24 consisting of squares of a coloured light transparent material such as geletin joined together to form an arc of a circle can be rotated between the screen of the cathode ray tube and the lens 25 of the camera taking the pictures. Movement of the filter 24 is controlled by count rate meter 26 which gives an output signal which varies as the activity seen by the camera 1 varies during scanning of the camera 1 relative to the patient. Thus activity in a particular plane causing a high count rate will show up as an in-focus picture in the colour corresponding to that count rate. In the other planes the colour dots will be blurred out and may mix in with other colours to form a white background.

Although the embodiment described uses five layers and thus causes five separate pictures of each layer either to be displayed on the screen of a cathode ray tube or stored in a computer, it is of course entirely possible that the number of layers be varied. The number could be greater or fewer as required in the interests of accuracy. Furthermore the pictures need not be displayed on a single cathode ray tube. Output signals from the resistance network 10 could be used to provide pictures on an many cathode ray tubes as required. For example one cathode ray tube might be used for each layer.

Furthermore, the present embodiment has been concerned with time multiplexing. It is, of course, entirely possible that instead of using two channels, one for X-co-ordinates and one for Y-co-ordinates, a channels could be used for each co-ordinate, each channel representing compensation for a particular depth. Thus the compensated signals could be obtained simultaneously instead of separately.

I claim:

1. A radiation position detecting device having a collimator for collimating radiation, means for deriving electrical signals representing the co-ordinates of the collimated radiation, means for deriving a signal representing the co-ordinates of the focal point of the collimator, means for compensating the received radiation signal by multiplication of the latter by a constant representing the distance between a selected plane parallel to the focal plane of the collimator and the focal plane itself, and the distance between the focal plane and the plane in which the collimated radiation is detected; and means for combining the co-ordinate signals of the focal point of the collimator with the received radiation signals so that the resultant signals are corrected to give the true co-ordinates of any events occurring in the selected plane.

2. A device as claimed in claim 1 wherein the means for deriving a signal representing the co-ordinates of the focal point of the collimator comprise a pair of potentiometers the values of which vary in accordance with relative movement between the collimator and an area being scanned.

3. A device as claimed in claim 1 wherein the means for compensating the received radiation signal comprises a resistance network to which the received radiation signal is supplied, the radiation network including a plurality of resistances relatively proportioned so that the received radiation signal is appropriately compensated.

4. A device as claimed in claim 1 wherein the means for deriving the electrical signals representing the co-ordinates of the collimated radiation comprises a scintillation crystal, and a matrix of photodetectors.

5. A device as claimed in claim 4, wherein the means are provided for weighing the outputs of the photodetectors by given factors in both the X- and the Y- co-ordinate directions.

6. A device as claimed in claim 5, wherein means are provided for the outputs of the photodetector along the X- and Y-co-ordinates to derive the electrical signals representing the co-ordinates of the collimated radiation.

7. A device as claimed in claim 1, and comprising means for separating the received radiation signals into a number of equal signals, and means for multiplying each of these signals with a different compensating value, the compensating values representing a range of depths, so that each of the separated received radiation signals is corrected to give the true co-ordinates of events occurring in a selected plane.

8. A device as claimed in claim 7, and including means for sampling the received radiation signals, for dividing the sampled signals into equal pulses, for multiplying each pulse with a selected compensating value, and for multiplexing the resultant signals so that they can be individually stored or displayed.

9. A device in claimed in claim 8 further including means for summing the outputs of the photodetectors in the X- and Y-co-ordinates, and a pulse height analyser giving an output pulse if the summed photodetector is of or above a predetermined magnitude to a pulse generator, the pulse generator generating a train of pulses controlling said multiplexing means.

10. A device as claimed in claim 9 and including a cathode ray tube for displaying the compensated output signal.

11. A device as claimed in claim 10 and including a colour coding device for emphasing contrast between in and out of focus pictures on the cathode ray tube, the coding device comprising a plurality of colour filters which can be moved in front of the screen of the cathode ray tube, a count rate meter which generates an electrical signal which varies as the activity seen by the camera varies during scanning, and means for controlling the movement of said colour filters in response to the latter signal so that activity particular plane causing a high count rate will show up as an in-focus picture in a colour corresponding to that count rate.

* * * * *